United States Patent [19]

Schine

[11] Patent Number: 4,737,693
[45] Date of Patent: Apr. 12, 1988

[54] MODULATION DRIVE CIRCUIT FOR CRT DEFLECTION OF TELEVISION AND DATA DISPLAY TERMIALS

[75] Inventor: Jonathan M. Schine, Los Angeles, Calif.

[73] Assignee: High Resolution Sciences, Inc., Los Angeles, Calif.

[21] Appl. No.: 773,335

[22] Filed: Sep. 6, 1985

[51] Int. Cl.[4] .......................... H01J 29/70; H01J 29/76
[52] U.S. Cl. ...................................... 315/399; 315/365
[58] Field of Search ................ 315/378, 365, 408, 399

[56] References Cited

U.S. PATENT DOCUMENTS 2,672,576  3/1954  Landon .............................. 315/378
2,807,750  9/1957  Hobbs ................................ 315/378

Primary Examiner—Theodore M. Blum
Attorney, Agent, or Firm—Freilich, Hornbaker, Rosen & Fernandez

[57] ABSTRACT

An LC tank circuit in the collector of a power transistor controls the vertical modulation of the horizontal deflection of a CRT through additional deflection coils properly oriented. The tank circuit is tuned at a frequency nf for the desired modulation, where n is the number of cycles of oscillation of the tank for each drive pulse at a frequency (pulses per second) f, and each drive pulse is adjusted in width to one fourth or less of a cycle of the modulation frequency nf using an adjustable RC differentiating circuit and a threshold device to couple a squarewave signal at frequency f to the base of the power transistor.

5 Claims, 3 Drawing Sheets

MODULATION DRIVE CIRCUIT FOR CRT DEFLECTION OF TELEVISION AND DATA DISPLAY TERMIALS

BACKGROUND OF THE INVENTION

This invention relates to television and data display terminals, and more particularly to a circuit for sinusoidal modulation of the rasters at a predetermined rate.

To enhance the display of video or alphanumeric data on a cathode ray tube (CRT), it is desirable to synchronously modulate the raster scan at a predetermined frequency with an amplitude sufficient to significantly span the space between the rasters. For video, ½ raster spacing may be sufficient, but for data display, the amplitude of modulation may be greater. In either case, it is desirable to introduce the modulation with an efficient circuit.

For the purpose of illustrating the invention, reference will be made to data display terminals, since application of the modulation circuit to a television receiver or monitor will be analogous. The raster scan patterns differ only in the number of rasters per frame, and in the fact that for television the rasters are divided into two interlaced fields. In every case, the horizontal sweep circuit is reest to zero, and as the horizontal sweep increases for one raster, the vertical sweep increases for the amount of the desired raster spacing, either in one initial step, or more commonly for television receivers and monitors, at a low constant rate.

In a typical data display terminal, a frame is divided into 80 columns and 24 rows. Each column provides a character space, and each row provides a line of characters. The character space defined by a column and row count is further subdivided into a matrix of dot positions, typically 8×11, where each of seven horizontal dot positions in each of ten rasters (scan lines) may be selectively brightened to make up a character. The useful dot matrix within a character space is thus 7×10, leaving a clear raster to separate lines of characters, and a clear column at the end (or beginning) of each character to separate characters in a line. Consequently, the entire field displayed is divided into an array of 560×264 adjacent dot spaces, even though some spaces are not used, to provide spaces between characters and lines of characters, and within a 7×10 matrix, only those actually needed to form a character are used while displaying data.

For data display purposes, a clock generator operating in the megahertz range is divided down to obtain a 60 Hz vertical (V) sync rate, and down further to get horizontal (H) sync rates, thereby producing a field display at the rate of 60 per second. This chain of dividers will not only synchronize the data display with the horizontal and vertical scan of noninterlaced fields, but provide the addressing information necessary to read out into a shift register trains of binary digits, where each bit 1 will cause the beam to brighten a dot as a raster is scanned. When the entire set of rasters for a line of characters have been scanned, and all 24 lines of data have been displayed, the data stored in a RAM will have been displayed in 80×24 character spaces.

For each character space, the shift register is loaded with a new train of binary digits as a line of data is displayed. These binary digits define the dots to be displayed and, as the last of the previous train is shifted out into a video mixer that combines sync and blanking with the binary digits into a composite signal for display, the next set of binary digits is loaded into the shift register. In the CRT display unit, a horizontal (H) and vertical (V) drive generator responds to the horizontal and vertical sync pulses to produce the horizontal and vertical drive signals applied to deflection coils, while the binary digits from the shift register, and the blanking signals, are applied to the cathode of the CRT. In that way, the beam is brightened for dots defined by 1 bits out of the shift register, and blanked at all other times while 0 bits are shifted out and while the blanking signals for raster and field retrace intervals are present.

To form a line of characters the clock frequency divider is used to address a random access memory (RAM) for each line of 80 characters, one character at a time in sequence. Each output character code, together with the output of a counter that counts the lines of characters, addresses a character generator implemented with a read only memory (ROM) to produce in sequence the corresponding lines of binary digits that define the characters in the row addressed. A shift register receives the binary digits in parallel for one character at a time in sequence, and converts them into a continuous serial train. After the procedure has been repeated ten times for one line of 80 characters, the address to the RAM is advanced to the next line of 80 characters. In that manner the output of the RAM addresses the character generator to convert the character code out of the ROM into the binary digits that define the positions of dots for the characters.

As described in a copending application Ser. No. 686,219 filed Dec. 26, 1984, display is enhanced by vertical modulation of the horizontal raster scans at a frequency that will produce one complete cycle per M×n dot matrix space. For optimum results, the depth of modulation should be at least ±¼ the spacing of the raster scans, depending on beam width, dot duration, and line spacing. Then, as an M-bit code for a character to be displayed is read out of a shift register, clocked at the frequency required for a line of data to be displayed in a raster scan as a dot for every bit 1 in the M-bit code, each dot is displayed during a portion of one cycle of modulation in the dot space.

The phase of the modulation is adjusted relative to the shift register clock so that a dot is displayed while the beam is being deflected between negative and positive maxima, on either the positive or the negative slope. In that manner a fixed M×n dot matrix space is used for each character with the elliptical dots displaced with their major axis at an angle with respect to the horizontal. The space between dots in a direction having a vertical vector component is thus reduced, and in the special case of the direction being about half way between the horizontal and the vertical, such as at 45°, a nearly perfect continuous line will appear. This improvement is achieved without significantly degrading the horizontal resolution. This is because the dot spacing is not as great in the horizontal direction as in the vertical. i.e., the dot spaces are usually rectangules having a width that is less than the height. This is particularly true of the state-of-the-art 80 column display, as opposed to a 40 column display. The more noticeable effect is a thickening of horizontal portions of the characters displayed with some lessening of thickness in the portions having a vector component in the vertical direction, and near perfect portions having a slope of about +45° if the dots are displayed on the positive slope of the modulation, or a slope of about −45° if the dots are displayed on the negative slope of the modulation, but not both; in one there will still be some space between dots discernable, but in the more usual dot-matrix, alphanumeric characters, only a small percentage of the character lines are in the disadvantageous direction. Even in upper case letters, about one out of five will have not more than about 20% of their lines at the disadvantageous direction, so the net effect is a significant improvement in character resolution in about 96% of an 80×24 character display. If the dot is displayed at the peak (positive or negative) of the modulation, a crescent shaped dot will be produced that will tend to fill vertical gaps between the rows of dots.

SUMMARY OF THE INVENTION

In accordance with the present invention, the horizontal scan of a cathode ray tube (CRT) for a television receiver or monitor, or a data display terminal, is modulated in the vertical direction by additional deflection coils positioned on the neck of the CRT, and orienting them for vertical deflection. The additional deflection coils are separately driven while the deflection coils in the yoke of the CRT are driven by horizontal and vertical deflection signals. For efficiency in the modulation drive circuit, a power transistor is periodically turned on for one fourth or less than a modulation cycle which may be at a frequency nf, where n is a small integer such as 2 and f is the frequency (pulse rate) of the signal driving the transistor. An LC tank (parallel-resonant circuit) in the collector circuit then produces a sinusoidal signal in the additional coils coupled to the collector of the power transistor. The end of the tank remote from the power transistor is connected to circuit ground, and the emitter is connected to a source of power by a current limiting resistor. The additional coils, which may each consist of about 4 loops on opposite sides of the CRT neck, are coupled by a capacitor in series between circuit ground and the collector of the power transistor. By using a coaxial cable for the coupling, the outer conductor of the cable is used for the circuit ground connection of both the LC tank circuit and the additional coils, thus shielding the conductor between the coupling capacitor and the additional coils.

The novel feature of the invention are set forth with particularity in the appended claims. The invvention will best be understood from the following description when read in conjunction with the drawings.

DESCRIPTION OF PREFERRED EMBODIMENTS

Figure 1:
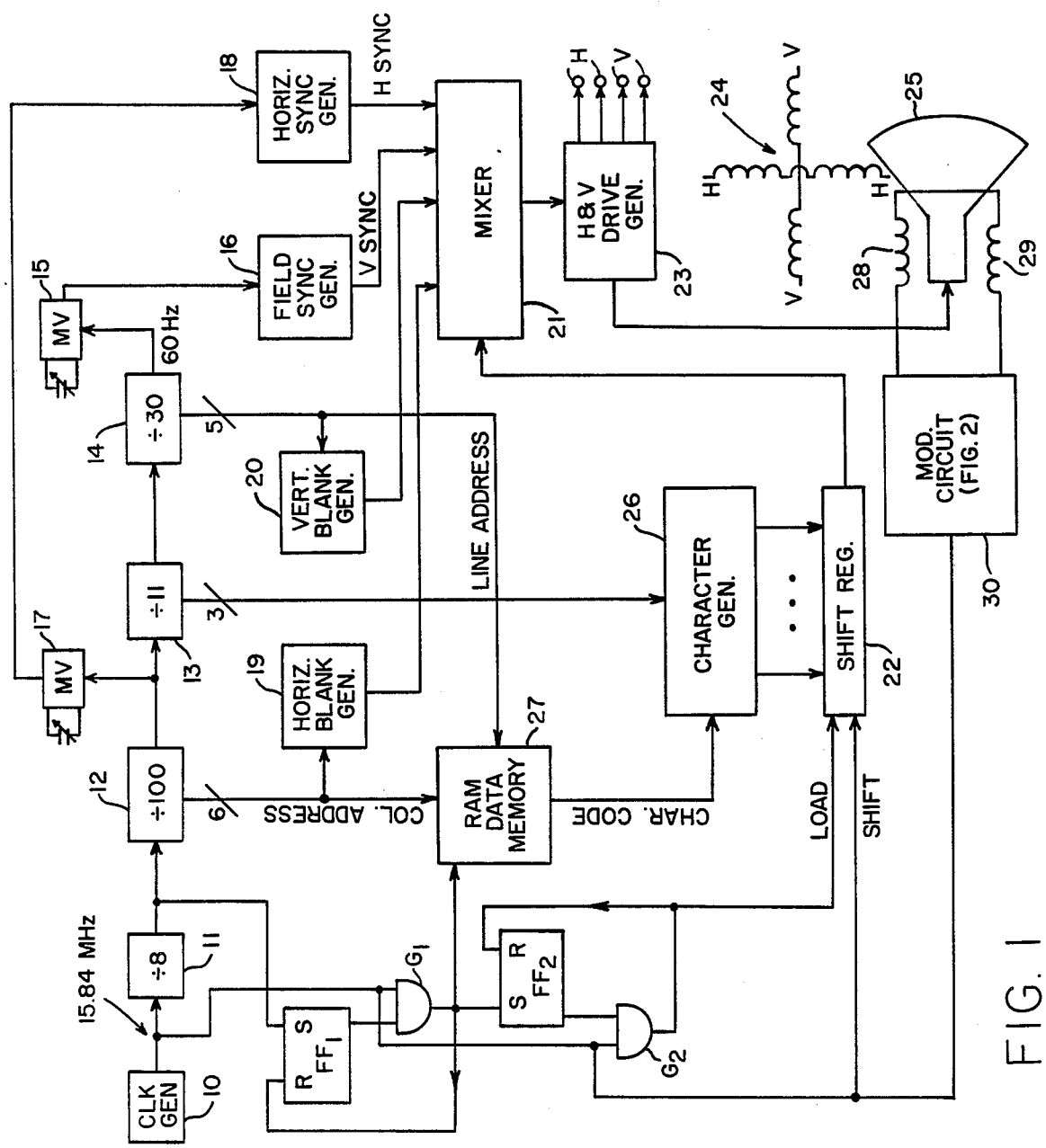
FIG. 1 is a block diagram of an examplary data display terminal using the present invention.

Referring now to FIG. 1, the exemplary data display system in which the present invention is used will first be described. Then the present invention used therein will be described with reference to FIG. 2. For simplicity, a conventonal display of 80 columns and 24 rows of data will be used in the example.

A clock generator 10 operating at 15.84 MHz is connected to a frequency dividing chain comprised of binary counters 11 through 14. The output of the last counter 14 at 60 Hz is connected by a delay multivibrator 15 to a vertical (V) sync generator 16 for field synchronization. The output of the counter 12 at 19.8 kHz is connected by a delay multivibrator 17 to a horizontal (H) sync generator 18 for synchronizing the display of 330 rasters at the rate of 60 fields per second. The multivibrators are included to provide variable delay that can be used to adjust the timing of the H and V sync pulses.

The H and V sync pulses are combined with raster and field blanking signals derived from blanking generators 19 and 20 which decode the outputs of counters 12 and 14 to produce horizontal and vertical blanking signals at all points outside the 80×24 character display, as determined by the column address from the counter 12 and the line address from the counter 14. The H and V pulses are combined in a mixer 21 which adds dot display signals from a shift register 22 to produce a composite character display signal. This composite signal is applied to a conventional horizontal and vertical (H and V) drive generator 23 which drives the H and V deflection coils in a yoke 24 of a cathode ray tube 25, and passes on the dot display signals to the cathode of the cathode ray tube.

The dot display signals from the shift register represent a continuous train of dot-matrix coded binary digits in groups of 8, one group for each of 40 characters of a line of data. To produce the entire line of characters, each in an 8×11 dot matrix, a set of 11 trains, each of 640 bits, are read into the shift register 22 from a character generator 26 in groups of 8 bits, one 8-bit character code for each of 80 characters repeated eleven times for each of the eleven rows of the 80 characters. In actual practice, the ROM stores only the bits of the 7×10 part of the dot matrix space. The eighth bit not read from the ROM is effectively inserted into the train at the output of the shift register 22, and the eleventh 8-bit code for each character may be effectively implemented at the line address input of the character generator which decodes the eleventh line address, and in response to that, force the output of the ROM to be zero regardless of the character code being received.

The divider 12 is used to address a RAM data memory 27 for the 80 characters in a line. Note that there are 100 possible character addresses generated by the divider 12, but only character addresses 10 through 90 are decoded, thereby effectively providing a blank space of 10 characters on each side of the data display block which is forced to be blank by the horizontal blanking generator 19.

The RAM data memory is advanced from line to line by a line address from the divider 14. Here again there are 30 line addresses possible, but the RAM memory only accepts addresses for lines 2 through 25 thereby effectively leaving one blank line above and five blank lines below the 80×24 block of data which is forced to be blank by the vertical blanking generator 20. A 25th line of operating information may be displayed in one of the remaining five, such as the second line, leaving the remaining three lines for field retrace.

The output of the divider 11 sets a flip-flop FF$_1$ which enables an AND gate G$_1$ to transmit the next clock pulse from the clock generator 10. That transmitted pulse not only synchronizes the operation of the RAM data memory in reading out a character code as an address for the character generator, but also resets the flip-flop FF$_1$. The output of the AND gate G$_1$ sets a flip-flop FF$_2$ to enable an AND gate G$_2$. The next clock pulse from the clock generator 10 is then passed so as to not only load the shift register 22 from the character generator output but also reset the flip-flop FF$_2$.

Each character code read out of the RAM data memory may be according to any code for which the character generator is designed, such as ASCII. That code is used to address the character generator 26 which has stored the dot code matrix for each character. Assuming an 8×10 matrix, the character generator 26 addresses each of the ten consecutive rows of the 80 matrices specified in sequence by the character code from the RAM data memory 27. As the RAM data memory is advanced across forty characters for ten consecutive times, the divider 14 holds the same line address, but each time the output of the divider 12 increments the divider 13, the output of the divider 13 is advanced by one to advance the character generator 26 to the next row of bits that define all Mxn matrices of the 80 characters in the line of data displayed.

The synchronized load of a 7-bit code may take place during the time the nonexistent eighth bit is read out of the shift register 22. If this is the last bit of the character generator code, left blank for spacing from the next character generator code, the shift pulse is effectively shifting out a bit 0 at the time the next 7-bit code is loaded into the shift register. This is accomplished in the shift register which has 7 stages to store a 7-bit code, and, after shifting out 7 bits, the load signal occurs overriding the shift control and forcing the output of the shift register to zero. That is done by an inhibit gate on the shift input that receives the load signal at its inhibit input, and an output gate normally enabled to pass the bits shifted out except during the presence of a load signal. In that manner, the eighth bit not read from the ROM is effectively inserted as a bit 0 in the 8-bit train at the output of the shift register 22.

The foregoing arrangement is common to virtually all data display terminals that have been devised in accordance with the teachings of U.S. Pat. No. 3,345,458, with only minor variations in implementation. The invention described in the aforesaid copending application departs from the teachings of U.S. Pat. No. 3,345,458 by using the output of the clock generator 10 (the shift clock pulse) to drive auxiliary vertical deflection coils 28 and 29 via a modulation circuit 30 shown in FIG. 2, so that for each character dot space of an 8×11 matrix, the CRT electron beam is modulated through one cycle. The phase of modulation is adjusted relative to the dot space to place the center of the displayed dot on the positive or negative slope or peak of the deflection. The depth of modulation is adjusted for the desired slope or peak with respect to the horizontal, such as $\pm\frac{1}{4}$ raster scan spacing, i.e., $\pm\frac{1}{4}$ row spacing of a dot matrix, for a slope of ±45°. In practice the dots are displayed with a diameter at least a quarter of a row spacing, and preferably between a half and a full row spacing.

By displaying the dots on the positive or negative slope of the sinusoidally modulated raster span, the tendency for the dots to be drawn out in a horizontal direction due to bandwidth limitation of the cathode ray tube is converted to a drawing out of the dots at an angle, such as about ±45°. This stretching out is made more pronounced by the sinusoidal modulation because the electron beam is moving at a faster speed than if the scan were in a straight horizontal line. So instead of the dots being elongated horizontally, the dots are elongated at an angle of about 45° to provide more coverage between dots in a direction having a vertical vector component. This reduces the tendency of horizontally adjacent dots to run together, but not enough to produce a perceptible space between them, and significantly increases the vertical dimension of the dots, for enhanced continuity of the character displayed in vertical and diagonal sections.

Figure 2:
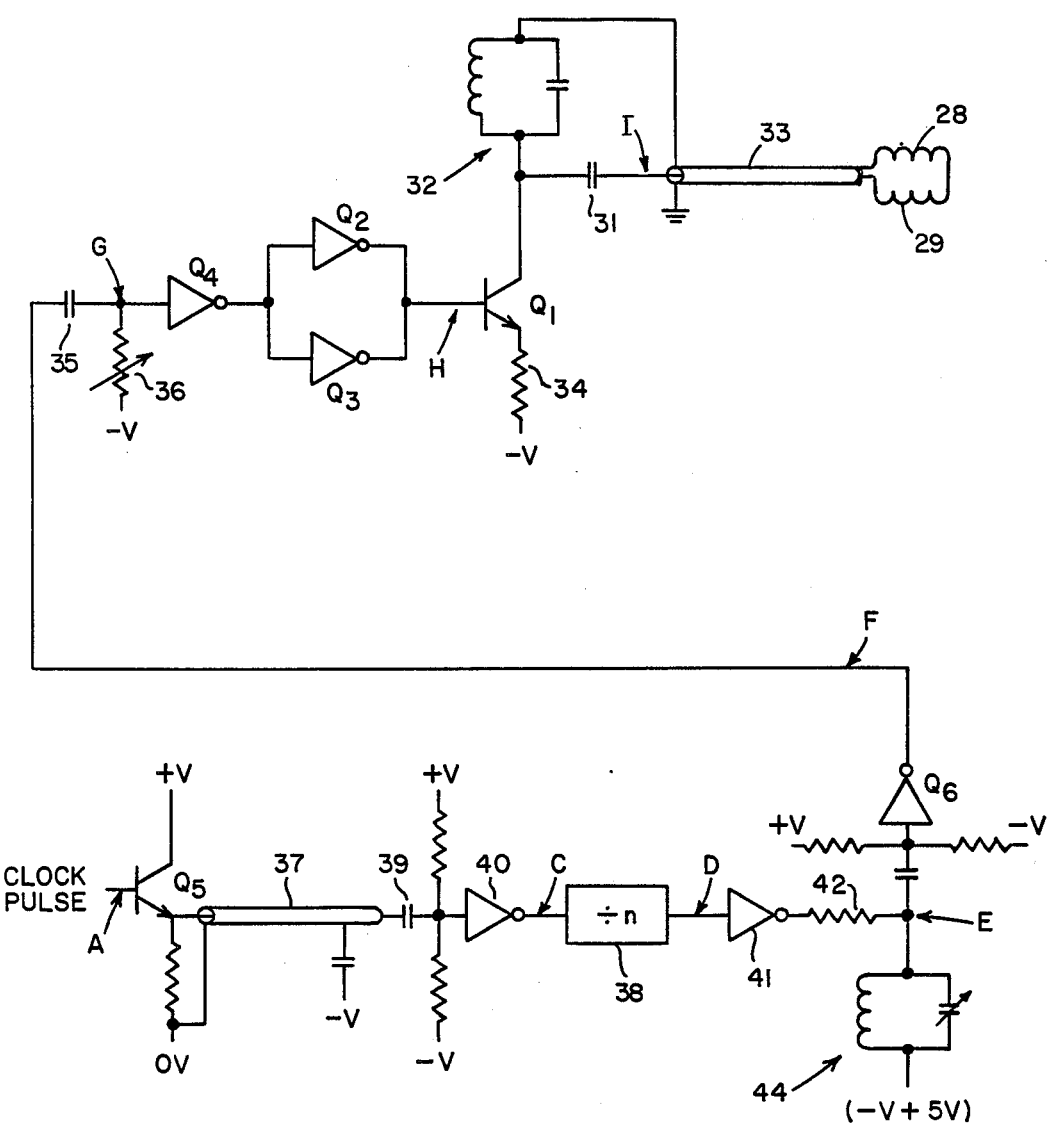
FIG. 2 is a diagram of the modulation drive circuit which constitutes the present invention.

Referring now to FIG. 2, the series connected auxiliary deflection coils 28 and 29 are ac coupled by a capacitor 31 in parallel with an LC tank circuit 32 using a 75-ohm coaxial cable 33. The LC tank circuit is connected to the collector of a power transistor Q$_1$, such as an SK3201 having an 80 MHz bandwidth, and the emitter of the transistor is connected to a source of negative voltage (typically −60 V) by a small current limiting resistor 34 (typically 8.2 ohms). The base of the transistor Q$_1$ is driven by one or more inverters, such as a 74HCO4 high performance CMOS gates Q$_2$ and Q$_3$ (low power complementary MOS silicon transistors) or LSTTL gates. A similar inverter Q$_4$ drives the parallel inverters Q$_2$ and Q$_3$. An RC circuit driven by a squarewave signal at frequency f and comprised of capacitor 35 and resistor 36 is used to adjust the pulse width of the output of the inverter Q$_4$ which functions as a threshold device, and therefore the pulse width driving the base of the transistor Q$_1$. The pulse width is adjusted to about one quarter or less of a cycle of the LC tank circuit 32 which resonates at a frequency nf, where n is typically 2 for an oscillation through two cycles for each pulse applied to the base of the transistor Q$_1$.

Clock pulses at a frequency nf for the shift register 22 (FIG. 1) are coupled by an emitter-follower transistor Q$_5$ and 300 ohm coaxial cable 37 to a frequency divider 38 by a capacitor 39 and inverting amplifier 40. Note that transistor Q$_5$ has its emitter connected to a 0 volt reference potential which is normally the circuit ground potential of the clock pulse source 10 (FIG. 1). The outer conductor of the coaxial cable 37 is connected to the same source of reference potential. The output end of the cable has its outer conductor connected to circuit ground (−V) of a power supply (not shown) for the circuit of FIG. 2.

Figure 3:
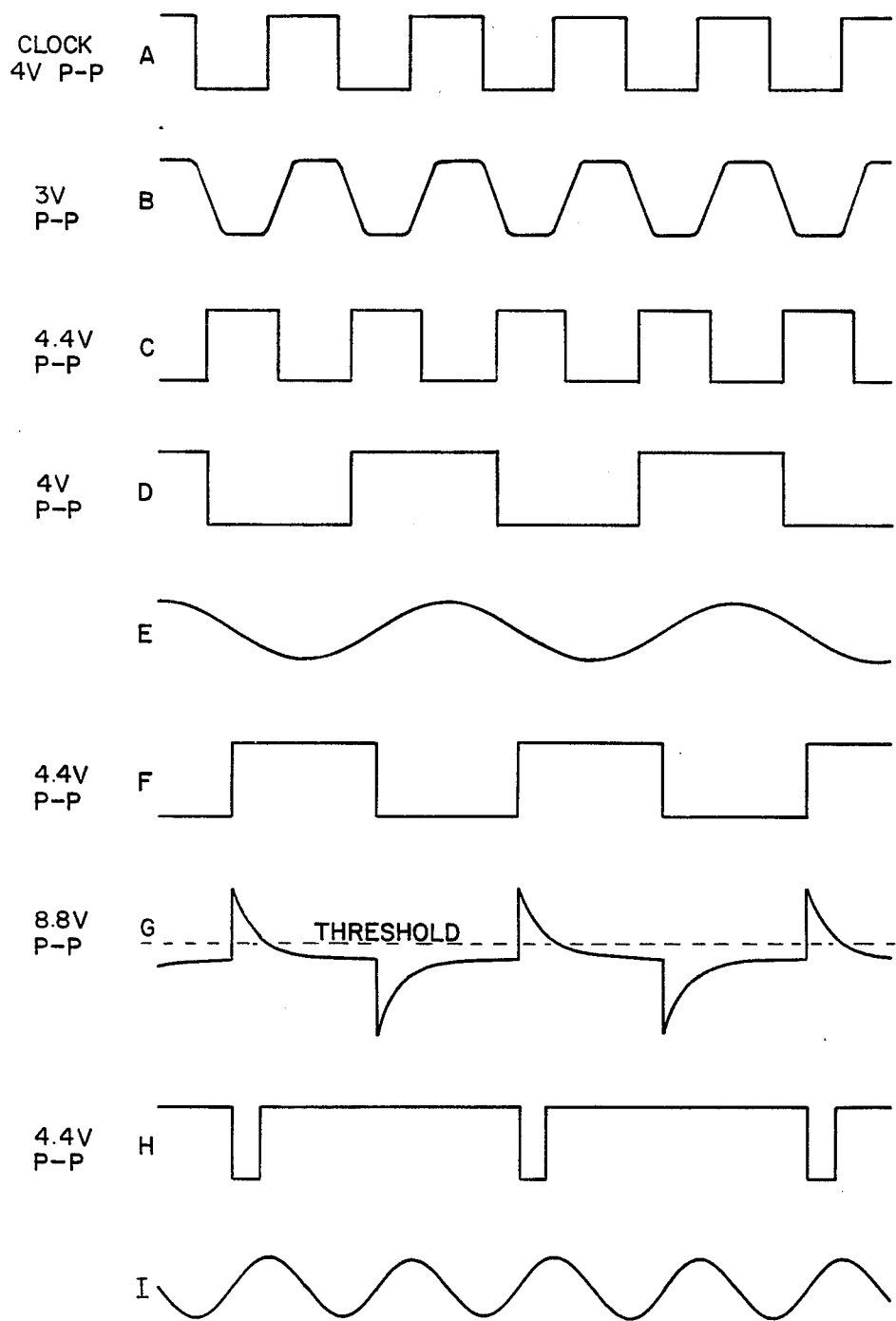
FIG. 3 is a waveform timing diagram useful in understanding the operation of the circuit of FIG. 2.

The frequency divider 38 will divide by n, which for this example is 2. The squarewave output of the divider 38, which thus alternates state on every clock pulse, is coupled by an inverting amplifier 41, series resistor 42 and capacitor 43 to a threshold device Q$_6$. Waveforms at points A,B, C and D in FIG. 2 are shown in FIG. 3. They illustrate that distortion in the cable will not affect the consistent period of the divider 38 which is precisely half the clock period. A junction between the coupling resistor 42 and capacitor 43 is connected to an LC tank circuit 44 where adjustments in phase of the sinusoidal modulation can be made by an adjustment of the capacitance (or inductance) of the tank circuit. In that manner the phase of the output of the gates Q$_2$ and Q$_3$ is adjusted for the desired effect on the display of the data with vertical modulation of raster scans as the dots that make up alphanumeric characters are displayed by adjusting the phase of the sinusoidal modulation produced by the additional coils 28 and 29.

As noted above, the output of the phase adjusting LC tank circuit 44 is coupled by the capacitor 43 to the threshold device Q$_6$ (74HCO4 or equivalent LSTTL gate) to produce a squarewave signal of frequency f. The RC differentiating circuit (comprised of the resistor 36 and capacitor 35) couple the squarewave signal from the threshold device (gate) Q$_6$ to the threshold device Q$_4$. By adjustment of the RC time constant of the differentiating circuit through the resistor 36, the width of each drive pulse applied to the transistor $Q_1$ is adjusted to one fourth or less than a cycle of the tank circuit 32 at frequency nf. Waveforms E, F, G and H of FIG. 3 illustrate the operation for the last half of the circuit in FIG. 2.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a cathode ray tube for a television receiver or monitor, or a data display terminal, which scans horizontal rasters with predetermined space between rasters for the display of video or data signals, means for vertical modulation of the rasters by additional deflection coils positioned on the neck of the cathode ray tube and oriented for vertical deflection while deflection coils in a yoke of the cathode ray tube are driven by horizontal and vertical deflection signals comprising a signal source at a frequency f, a power transistor having a resistor connected between the emitter thereof and a source of power, and the additional deflection coils connected in series between circuit ground and the collector of said transistor:

a capacitor coupling said additional deflection coils to the collector of said transistor, an LC tank circuit connected between the collector of said power transistor and circuit ground, said L tank circuit being tuned to a frequency nf, where n is a small integer orders of magnitude smaller than f, and means responsive to said signal at frequency f for turning on said power transistor for less than one fourth of a modulation cycle at said frequency nf.

2. The combination defined in claim 1 for a data display terminal wherein said signal at frequency f is a squarewave signal derived from a clock pulse train at a frequency nf.

3. The combination as defined in claim 2 including means for dividing said clock pulse train at a frequency nf by n to obtain a frequency signal at frequency f, and means for adjusting the phase of said signal at frequency f.

4. The combination as defined in claim 3 wherein said phase adjusting means includes an adjustable LC tank circuit for phase adjustment.

5. The combination of claim 4 including an RC differentiating circuit for adjustment of the period said power transistor is turned on during each cycle of said signal at frequency f, and a threshold device for coupling said RC differentiating circuit to the base of said power transistor, whereby an adjustment of the RC time constant of said differentiating circuit will adjust the period said power transistor is turned on for each cycle of said signal of frequency f.

* * * * *